United States Patent [19]
Funawatari

[11] Patent Number: 5,901,134
[45] Date of Patent: May 4, 1999

[54] DISK CARTRIDGE

[75] Inventor: Takatsugu Funawatari, Miyagi, Japan

[73] Assignee: Sony Corporation, Tokyo, Japan

[21] Appl. No.: 08/801,003

[22] Filed: Feb. 19, 1997

[30] Foreign Application Priority Data

Feb. 20, 1996 [JP] Japan .............................. P08-055397
Feb. 20, 1996 [JP] Japan .............................. P08-055398

[51] Int. Cl.⁶ .................................................. G11B 23/03
[52] U.S. Cl. ........................................ 369/291; 360/133
[58] Field of Search .................... 360/132, 133; 369/291

[56] References Cited

U.S. PATENT DOCUMENTS

| | | | |
|---|---|---|---|
| 4,646,176 | 2/1987 | Shimaoka et al. | 360/97 |
| 4,802,045 | 1/1989 | Yamaoto et al. | 360/132 |
| 5,045,959 | 9/1991 | Ishimatsu | 360/133 |
| 5,164,935 | 11/1992 | Shiegi et al. | 369/77.2 |
| 5,323,382 | 6/1994 | Takahashi | 369/291 |
| 5,325,243 | 6/1994 | Rath et al. | 360/71 |
| 5,577,014 | 11/1996 | Kawamura | 369/77.2 |
| 5,612,940 | 3/1997 | Otsuka et al. | 369/77.2 |
| 5,631,791 | 5/1997 | Osaki et al. | 360/133 |
| 5,694,278 | 12/1997 | Sumner | 360/133 |

FOREIGN PATENT DOCUMENTS 5-278779 10/1993 Japan .
7-192367 7/1995 Japan .

*Primary Examiner*—William J. Klimowicz
*Attorney, Agent, or Firm*—Limbach & Limbach L.L.P.

[57] ABSTRACT

A disk cartridge for accommodating a disk is composed of upper and lower shells. The upper shell has a pair of right and left wings covering right and left incorrect-insertion detection cut-away portion. When the right and left wings are formed in an integral fashion on the upper shell by means of molding, the upper surfaces of the respective wings in the regions inside periphery ribs are recessed so that these regions have a thickness nearly equal to the thickness of the roof wall of the upper shell. This structure allow the wings to have a great mechanical strength without having deficiency of synthesis resin.

6 Claims, 15 Drawing Sheets

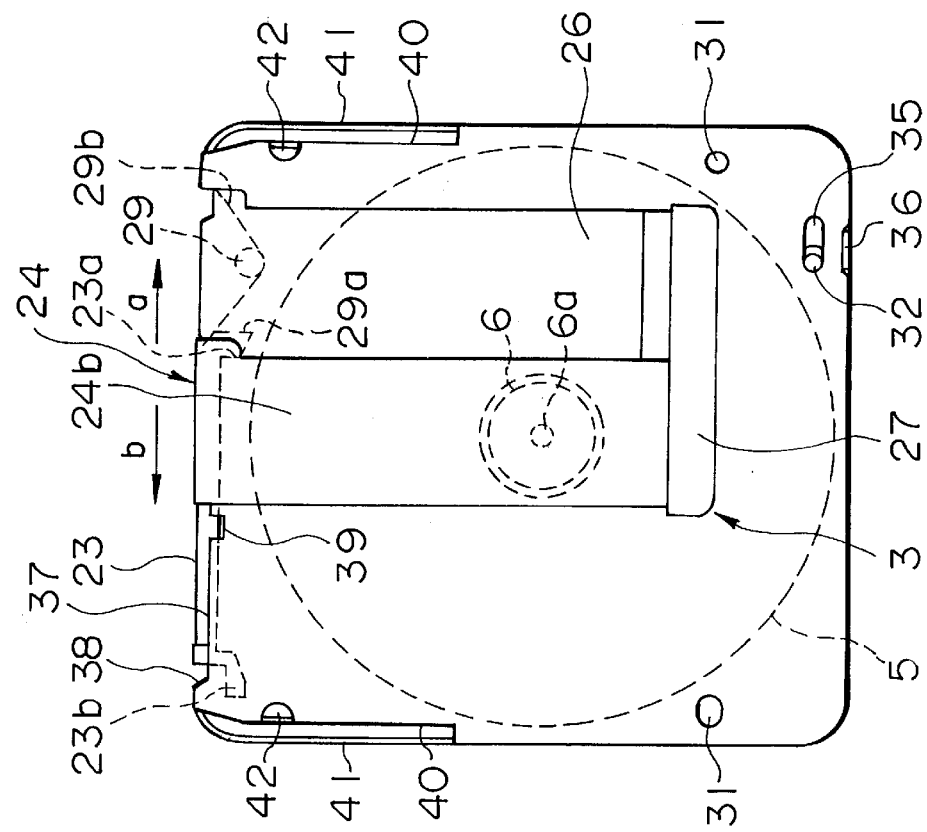
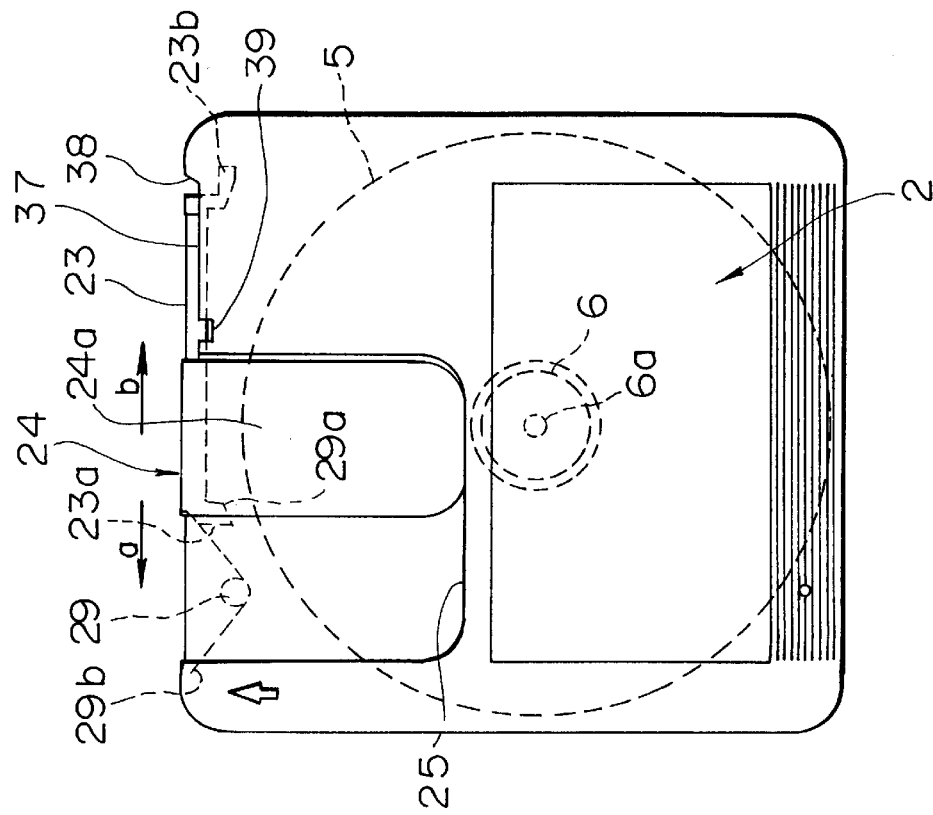

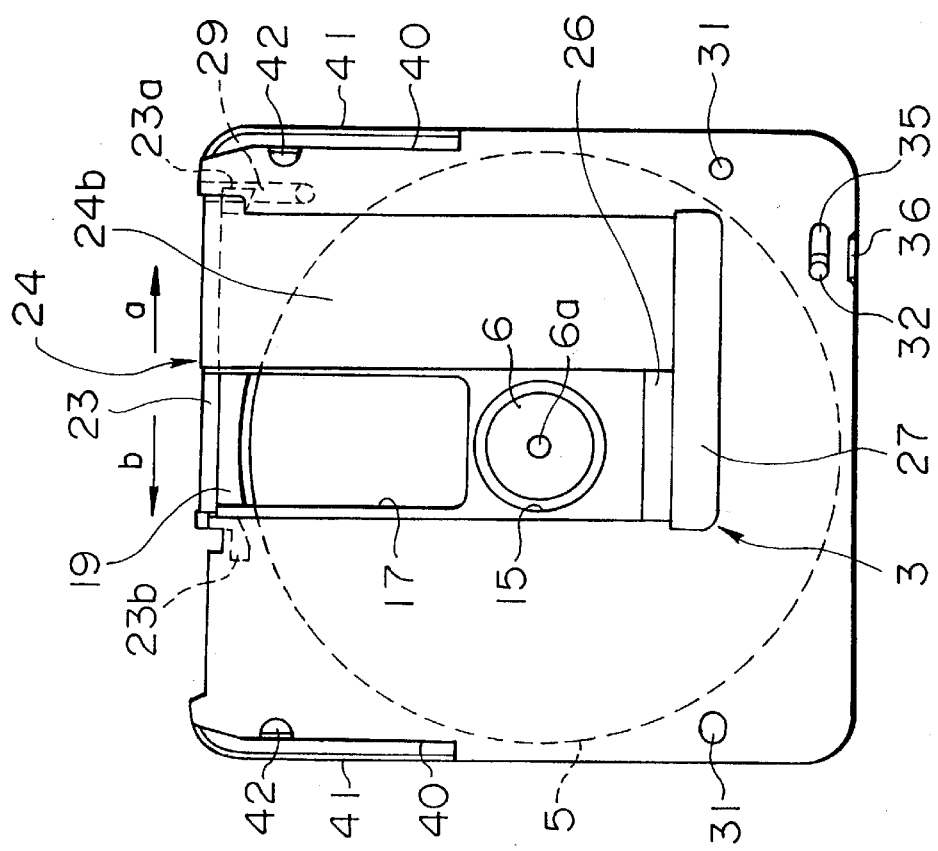
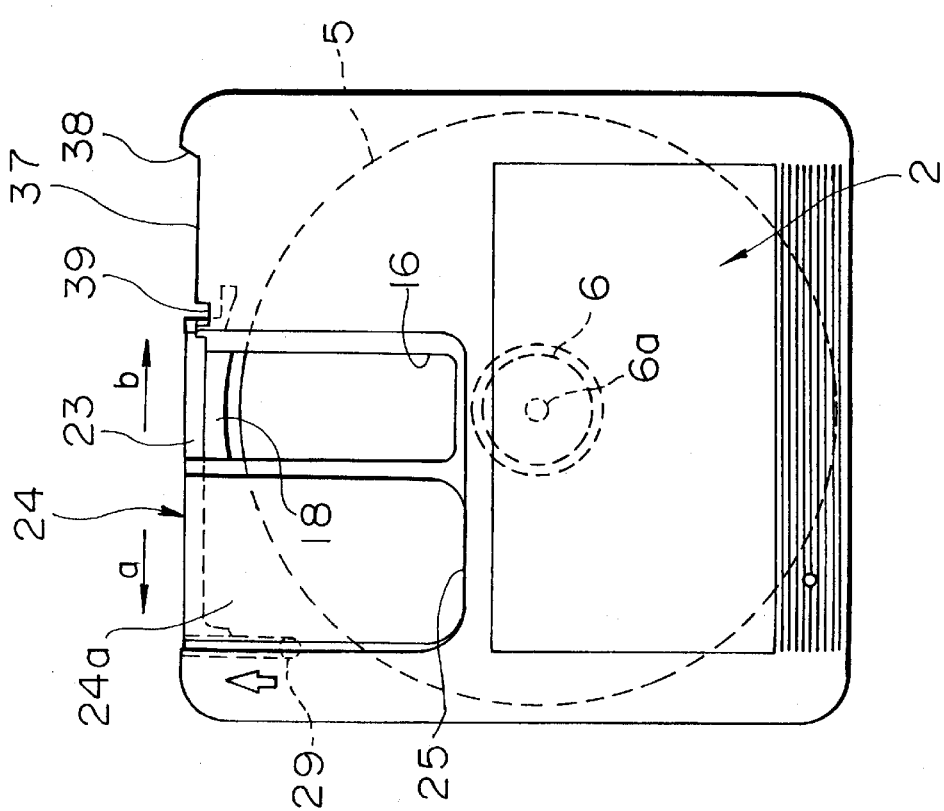
FIG. 10A
FIG. 10B

DISK CARTRIDGE

BACKGROUND OF THE INVENTION

1. Field of the Invention

The present invention relates to a disk cartridge particularly suitable as an HS cartridge for accommodating an HS disk for use for example in a high density MO disk drive system. More particularly, the present invention relates to a shell capable of accommodating a disk-shaped recording medium such as an HS disk in a freely rotatable fashion.

2. Description of the Related Art

Recently, an HS disk having a greater storage capacity than an MO disk and suitable as a high density magneto-optic disk for use in a high density magneto-optic disk system (often referred to simply as an HS) has been developed. An HS cartridge has also been proposed which serves as a high density disk cartridge for accommodating an HS disk in a freely rotatable fashion in a shell composed of upper and lower shells injection-molded with a synthetic resin. The HS disk has a diameter of about 3.5 inches (85–90 mm) and the HS cartridge has a size similar to that of a 3.5 inch floppy disk cartridge.

The HS cartridge has a pair of right and left incorrect-insertion detection cut-away portions formed in the front sides on the right and left sides of the lower shell wherein the "front side" refers to the side which faces the HS drive when it is inserted into the HS drive. The upper parts of the pair of right and left incorrect-insertion detection cut-away portions are covered with a pair of right and left wings disposed in the front sides on the right and left sides of the upper shell.

When and only when the HS cartridge is correctly inserted into a cartridge holder of an HS drive, a pair of right and left incorrect-insertion preventing projections formed in the cartridge holder can be fitted into the pair of right and left incorrect-insertion detection cut-away portions thereby ensuring that the HS cartridge is correctly inserted in the cartridge holder. If the HS cartridge is tried to be inserted into the HS drive in a wrong way (as in the case where the rear end of the HS cartridge faces the HS drive or as in the case where the upper side of the HS cartridge faces down) or a wrong cartridge such as a 3.5 inch floppy disk cartridge which is similar to but different from the HS cartridge is inserted, the insertion is prevented by the pair of right and left incorrect-insertion preventing projections.

When upper and lower shells of an HS cartridge are formed by means of injection molding with a synthesis resin, it is desirable that the thicknesses of the majority of roof and bottom walls of shells be as small as possible to reduce the overall shell thickness while maintaining the thickness of a pair of right and left wings of the upper shell at a great value to achieve a sufficiently great mechanical strength. However, if the thickness of the pair of right and left wings is greater than the thickness of the majority of the roof wall of the upper shell, deficiency of synthesis resin in the pair of right and left wings occurs during the molding process, which results in formation of hollows or other deformations at the surface of the wings of the upper shell. As a result, the appearance becomes very poor and the commercial value becomes very low.

SUMMARY OF THE INVENTION

It is a general object of the present invention to solve the above problems. More specifically, it is an object of the present invention to provide a disk cartridge having a small overall shell thickness while having a large enough thickness in a pair of right and left wings to obtain a sufficiently great mechanical strength, which can be produced without having deficiency of synthesis resin in the pair of right and left wings during the process of forming an upper shell with a synthesis resin.

According to the present invention to achieve the above objects, there is provided a disk cartridge having a pair of right and left wings covering the upper portions of a pair of right and left incorrect-insertion detection cut-away portions formed on both sides of a lower shell wherein the pair of right and left wings are integrally formed on the right and left sides of an upper shell in such a manner that the lower surface of a part of each wing inside its peripheral rib is recessed so that the wall thickness of that part becomes nearly equal to the thickness of the roof wall of the upper shell.

In the disk cartridge having the above structure according to the invention, since the pair of right and left wings are integrally formed on the right and left sides of the upper shell in such a manner that the lower surface of the part of each wing inside its peripheral rib is recessed so that the wall thickness of that part is nearly equal to the thickness of the roof wall of the upper shell, no synthesis resin deficiency occurs in the pair of right and left wings during the molding process.

BRIEF DESCRIPTION OF THE DRAWINGS

FIG. 9A and B illustrate a plan view and a bottom view of the HS cartridge with the shutter in the open position;

FIG. 10A and 10B are exploded perspective view illustrating the whose structure of the HS cartridge;

DESCRIPTION OF THE PREFERRED EMBODIMENTS

Figure 1:
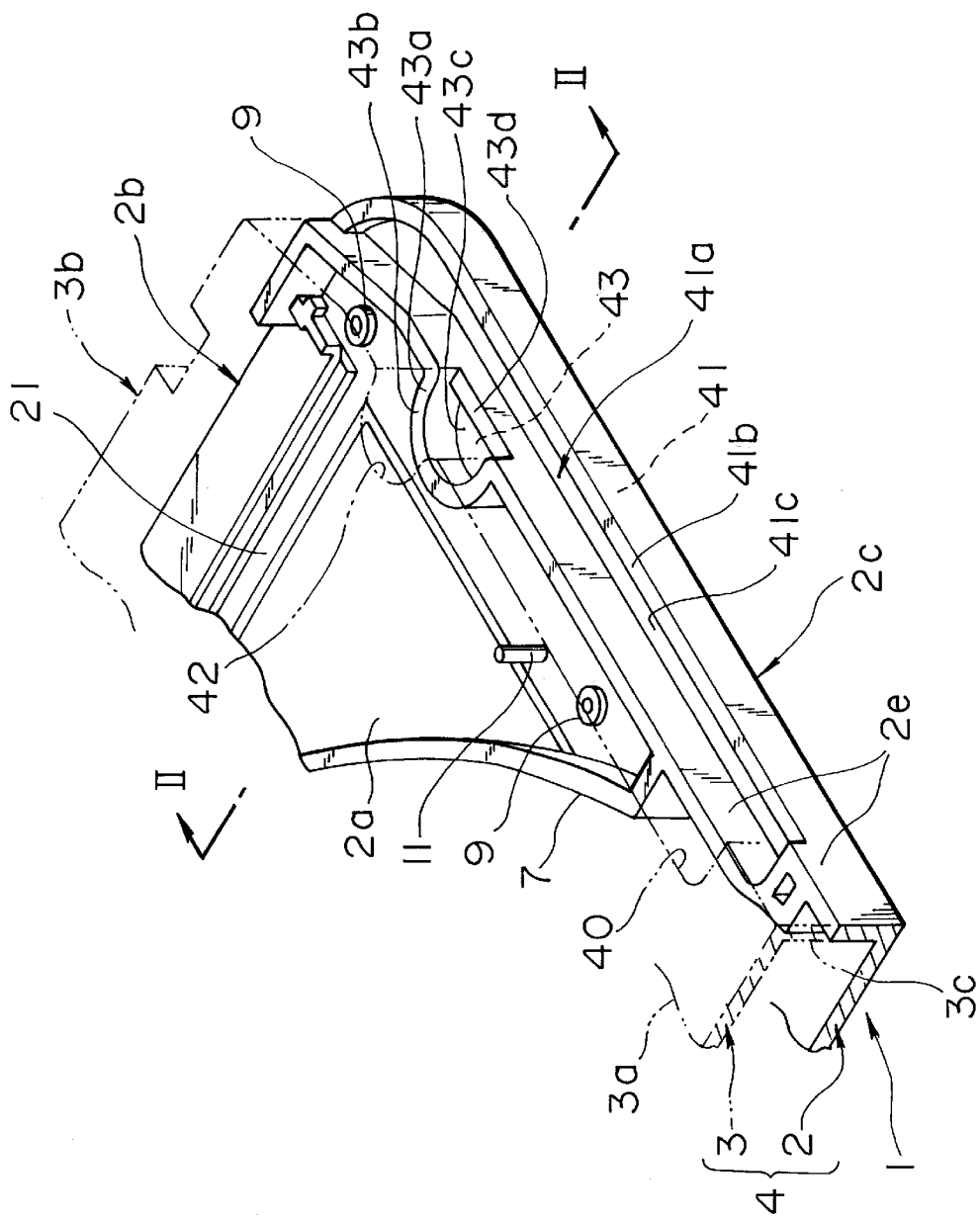
FIG. 1 is a perspective view of an embodiment of an HS cartridge according to the present invention.
Figure 2:
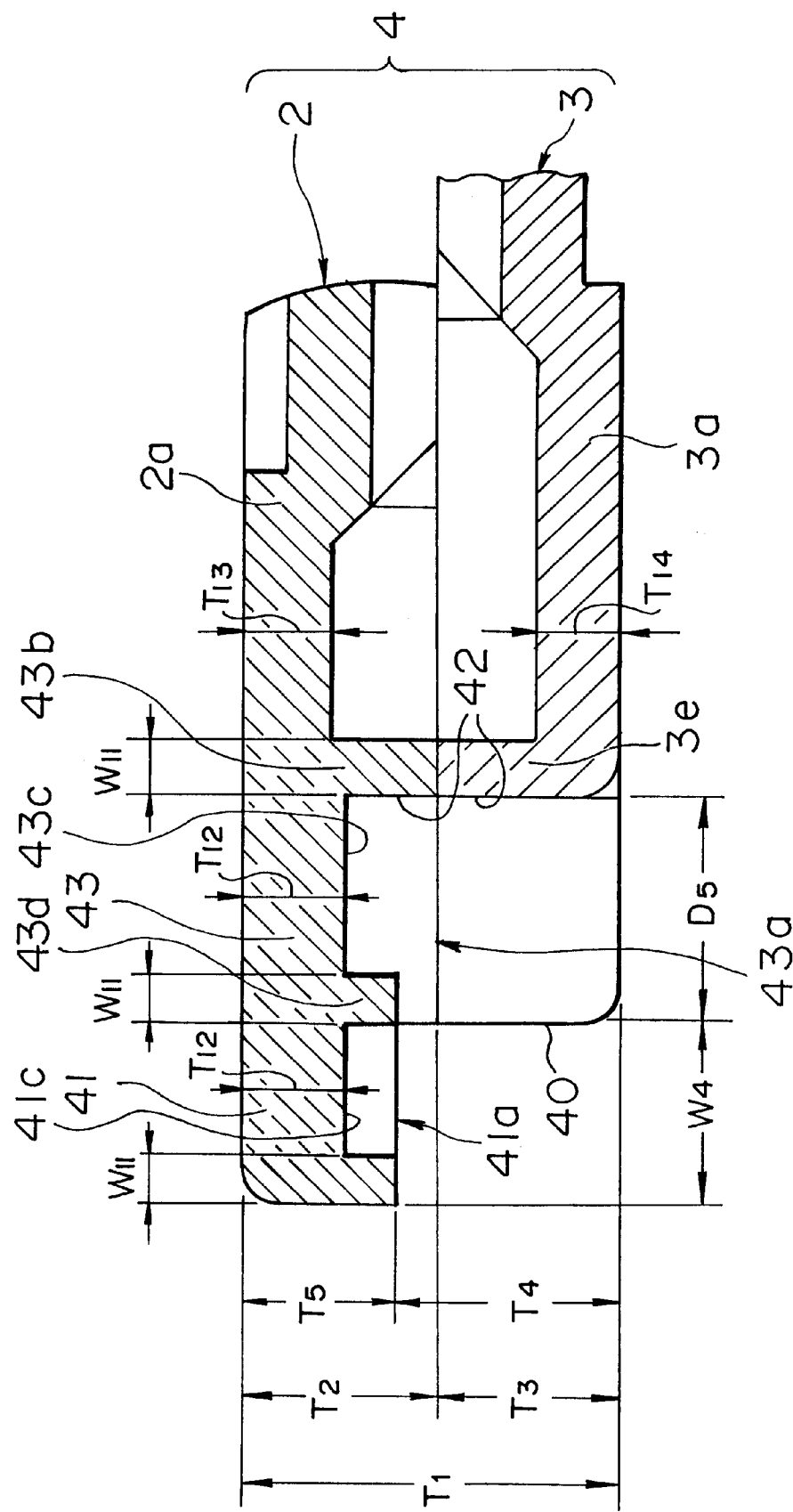
FIG. 2 is a cross-sectional view taken along line II—II of FIG. 1.

The HS cartridge of the present invention will be described in further detail below with reference to preferred embodiments in conjunction with the accompanying drawings.

Main Parts

Referring to FIGS. 1 to 5, main parts of the invention will be described first.

As described above, the object of the present invention is to provide a technique of producing a good-appearance and high-strength upper shell 2 having a pair of right and left wings integrally formed on the upper shell 2 in such a manner as to cover right and left incorrect-insertion detection cut-away portions 40 and cartridge drawing notches 42 wherein the wings are formed without encountering deficiency of synthesis resin and thus creating no hollows or other deformations on the surface of the pair of right and left wings 41 and roofs 43.

To achieve the above object, as shown in FIGS. 1, 2, 4, and 5, the lower surfaces 41a and 43a of the pair of right and left wings 41 and the roofs 43 on the cut-away portions of the upper shell 2 in the regions inside the peripheral ribs 41b and 43b are recessed so that these regions have a reduced thickness $T_{12}$ nearly equal to the thickness $T_{11}$ of the majority of the roof wall 2a of the upper shell 2 thereby producing recessed portions 41c and 43c on the lower surfaces 41a and 43a inside the peripheral ribs 41b and 43b. In this specific example, the thickness $T_{11}$ of the majority of the roof wall 2a of the upper shell 2 except the shutter sliding recess 25 is equal to 1.2 mm, the thickness $T_{12}$ of the pair of right and left wings 41 and the roofs 43 on the cut-away portions has a value between 1.2 mm to 1.4 mm, the horizontal width $W_{11}$ of the peripheral ribs 41b and 43b of the pair of right and left wings 41 and the roofs 43 on the cut-away portions is equal to 0.7 mm, and the thickness $T_{13}$ of the majority of the bottom wall 3a of the lower shell 3 except the shutter sliding recess 26 is equal to 1.3 mm.

If the lower surfaces 41a and 43a of the pair of right and left wings 41 and the roofs 43 on the cut-away portions inside the peripheral ribs 41b and 43b are recessed so that these parts have a thickness $T_{12}$ nearly equal to the thickness $T_{12}$ of the majority of the roof wall 2a of the upper shell 2, it becomes possible to prevent the deficiency of synthesis resin in the wings 41 and the roofs 43 on the cut-away portions during the process of forming the upper shell with the synthesis resin by means of injection molding. Therefore, it is possible to produce a good-appearance upper shell 2 having no hollows and other deformations on the surface (the upper surface of the roof wall 2a) of the wings 41 and the roofs 43 on the cut-away portions of the upper shell 2, while maintaining the mechanical strength at a sufficiently high level by forming the peripheral ribs 41b and 43b thereby allowing the wings 41 and the roofs 43 on the cut-away portions to have a great effective thickness. In this structure, it is possible to reduce the thickness Tll of the roof wall 2a of the upper shell and also the thickness $T_{13}$ of the bottom wall 3a of the lower shell 3 down to 1.2 to 1.3 mm, and thus it is possible to reduce the overall thickness of the shell 4 to as thin as about 5.0 mm.

Although the thickness $T_{12}$ of the pair of right and left wings 41 and the roofs 43 on the cut-away portions may also be set to 1.2 mm which is exactly equal to the thickness $T_{11}$ of the roof wall 2a of the upper shell 2, it is more desirable that the thickness $T_{12}$ of the wings 41 and the roofs 43 on the cut-away portions be greater than 1.3 mm so that when the upper shell 2 is made up of a semitransparent synthesis resin the wings 41 and the roofs 43 on the cut-away portions can become as less transparent as possible.

Figure 3:
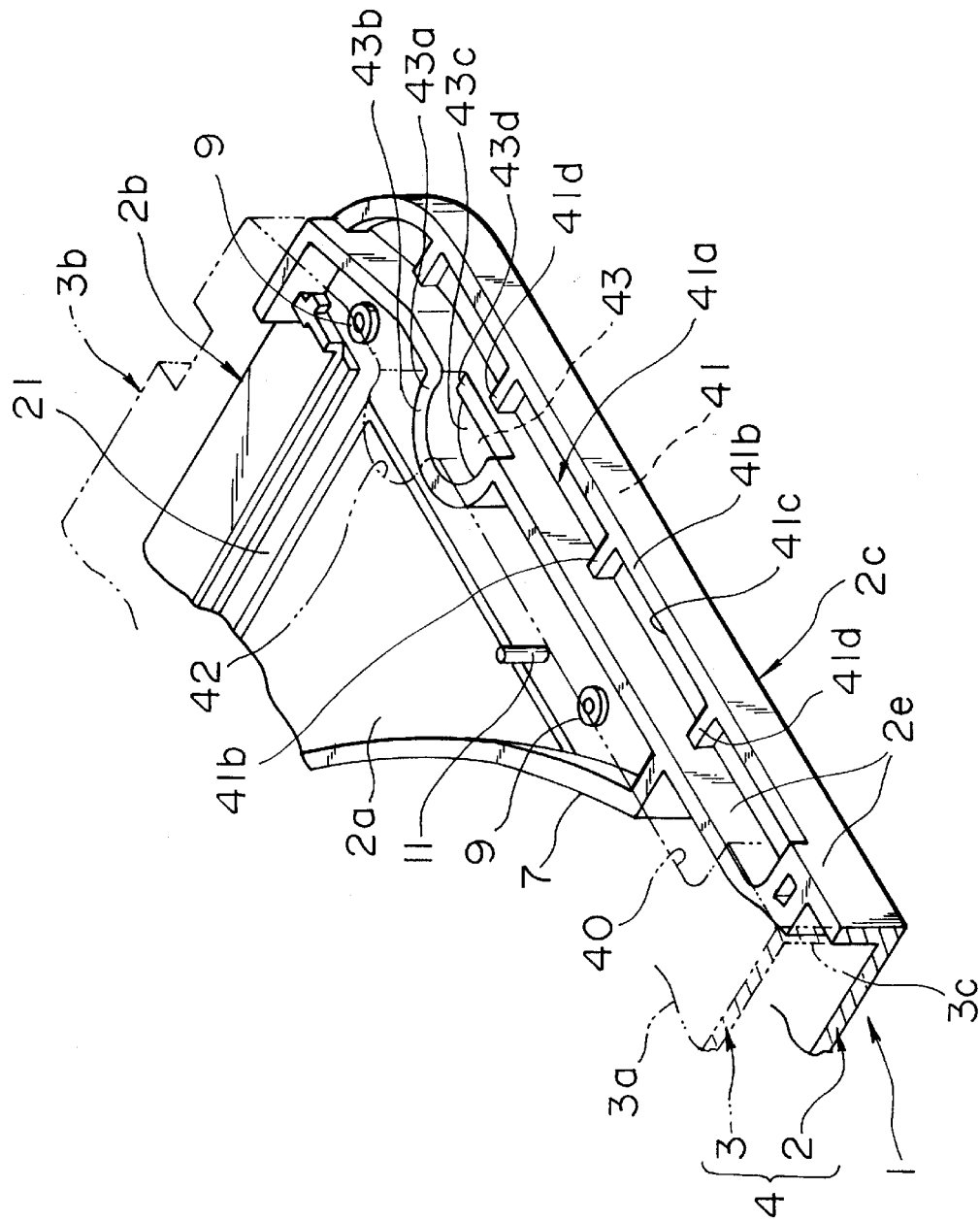
FIG. 3 is a perspective view of another embodiment of an HS cartridge of the invention.
Figure 4:
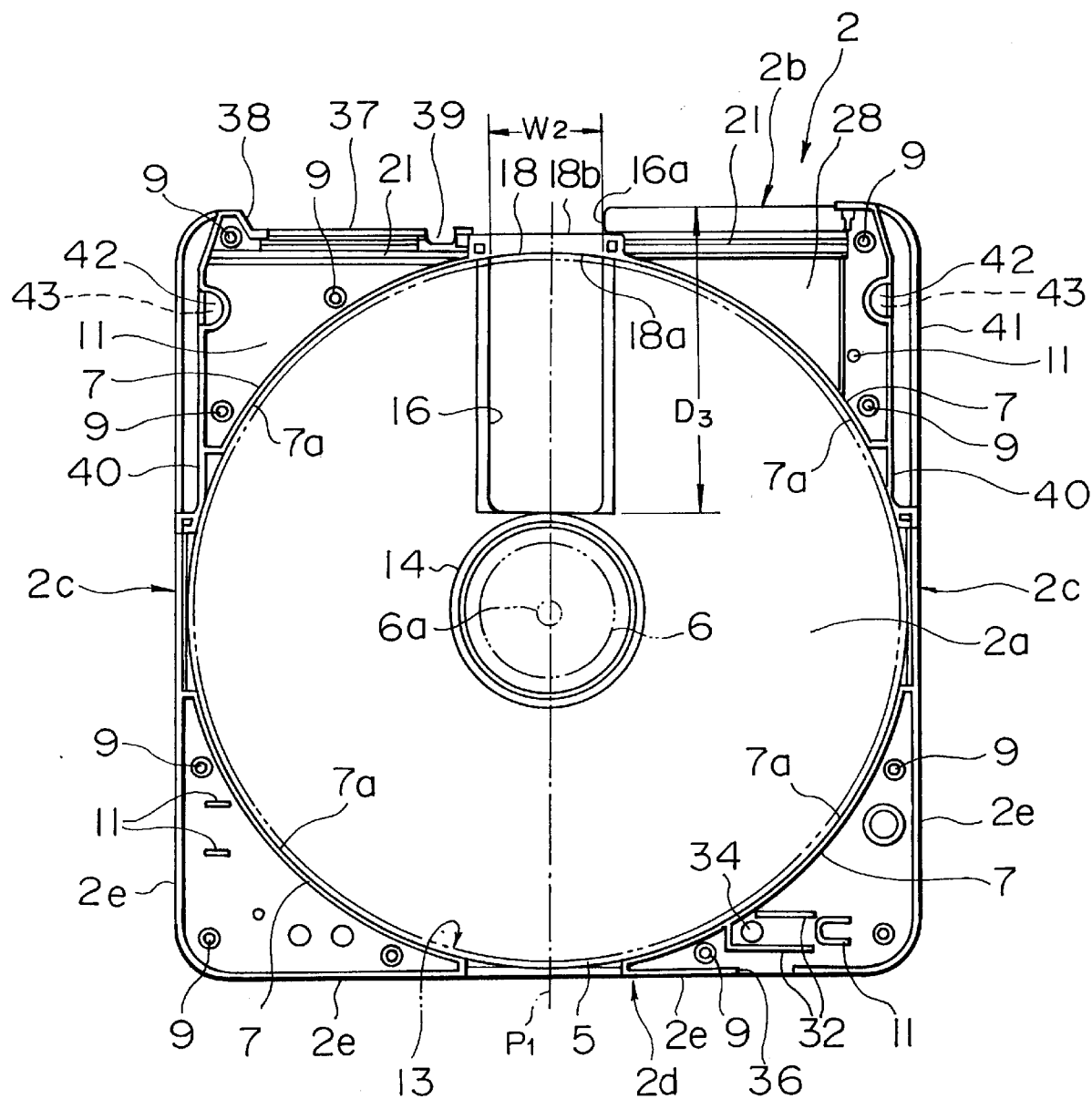
FIG. 4 is a bottom view of the upper shell of the HS cartridge.
Figure 5:
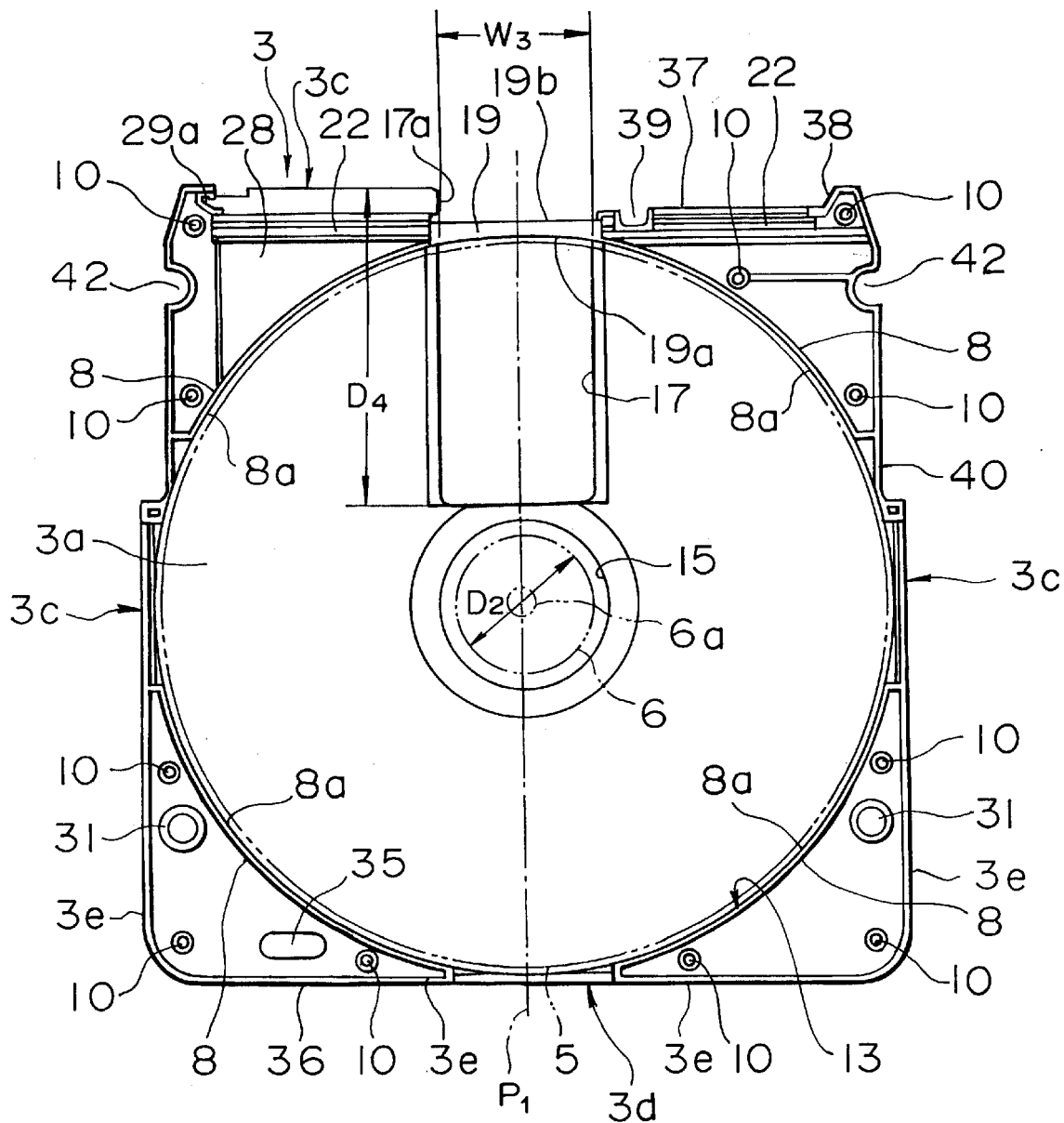
FIG. 5 is a plan view of the lower shell of the HS cartridge.
Figure 6:
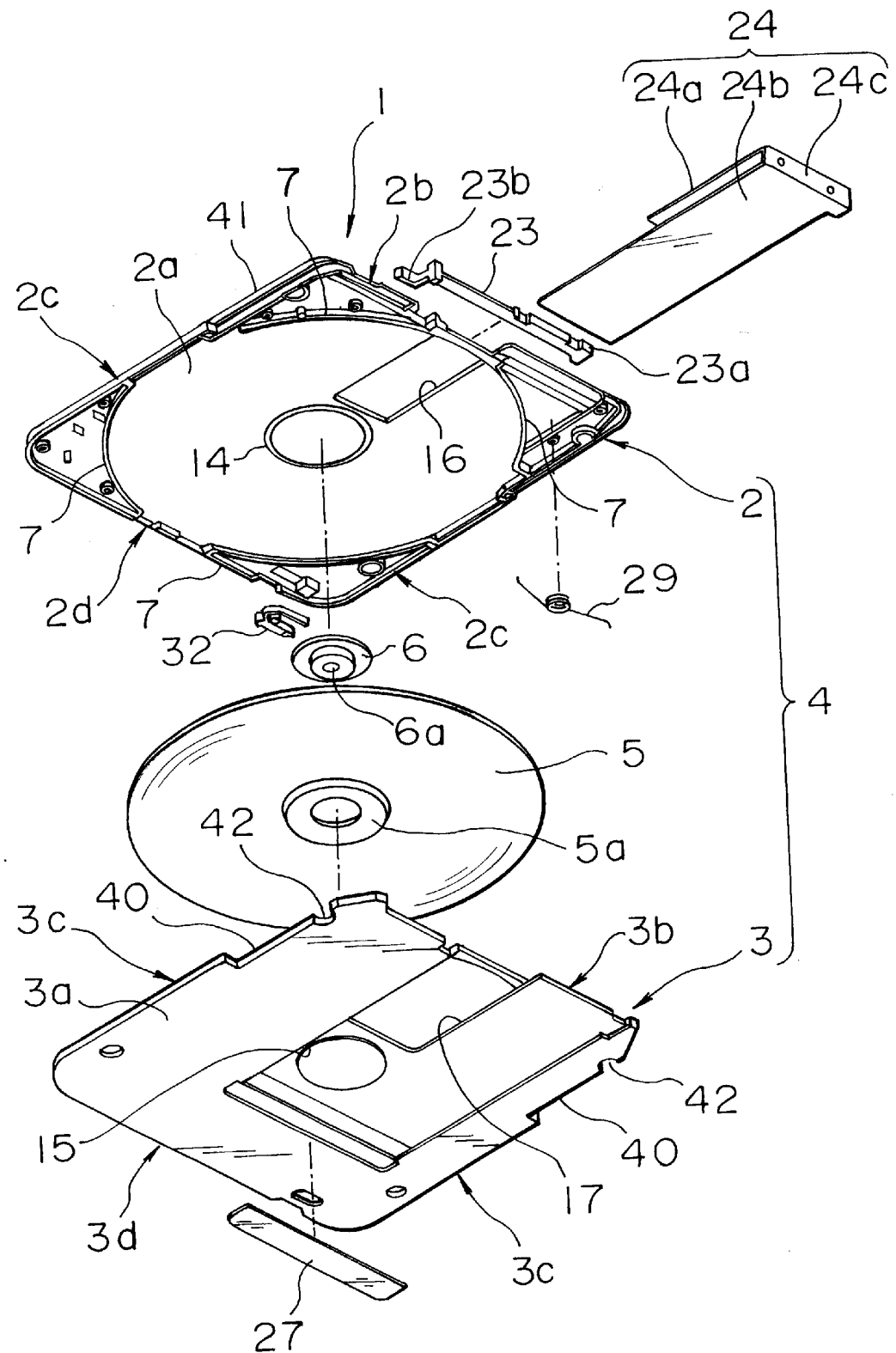
FIG. 6 is a perspective view illustrating the whole structure of the HS cartridge viewed from above.
Figure 7:
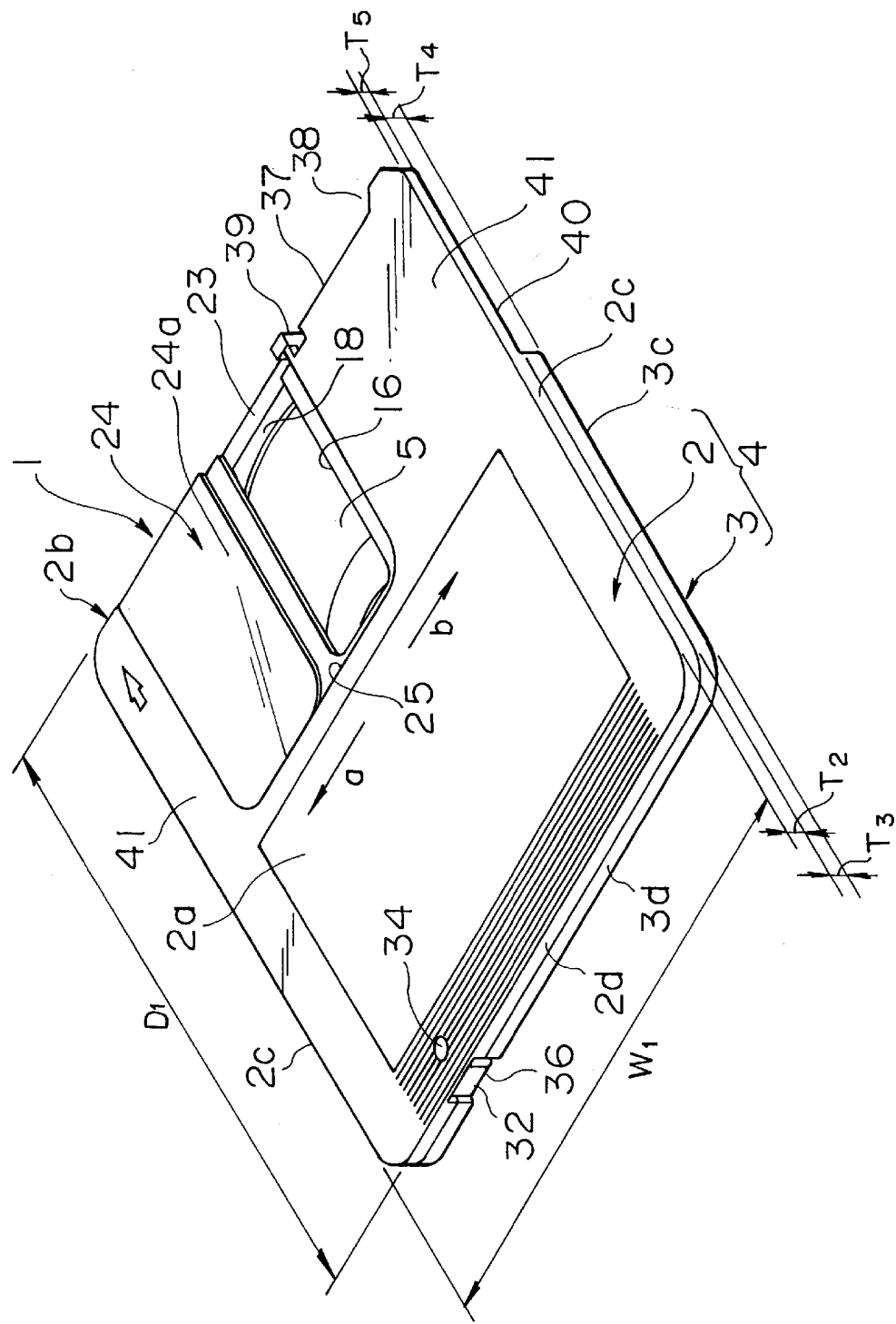
FIG. 7 is a perspective view illustrating the whole structure of the HS cartridge viewed from below.
Figure 8:
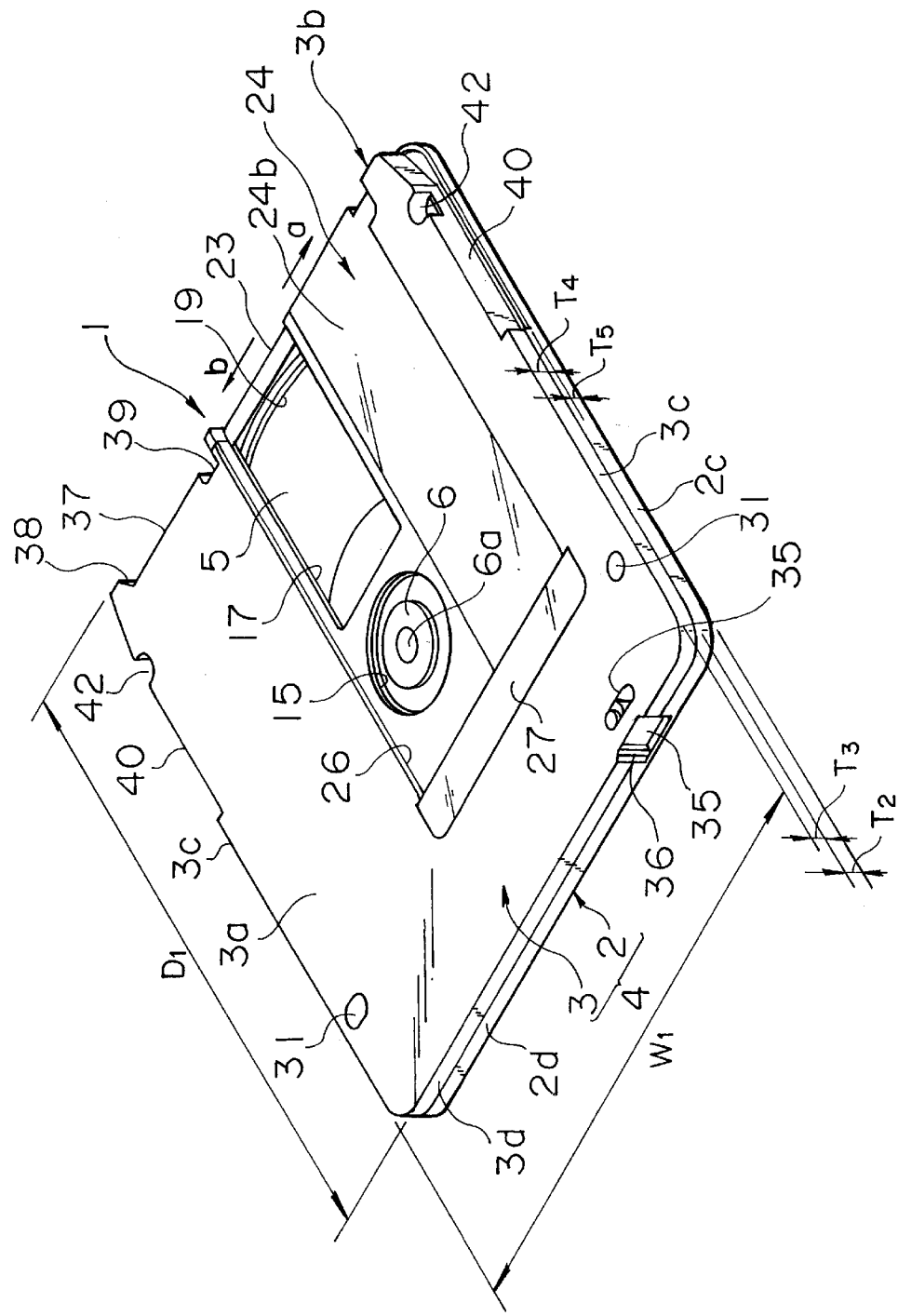
FIG. 8 illustrates a plan view and a bottom view of the HS cartridge with the shutter in the closed position.
Figure 11:
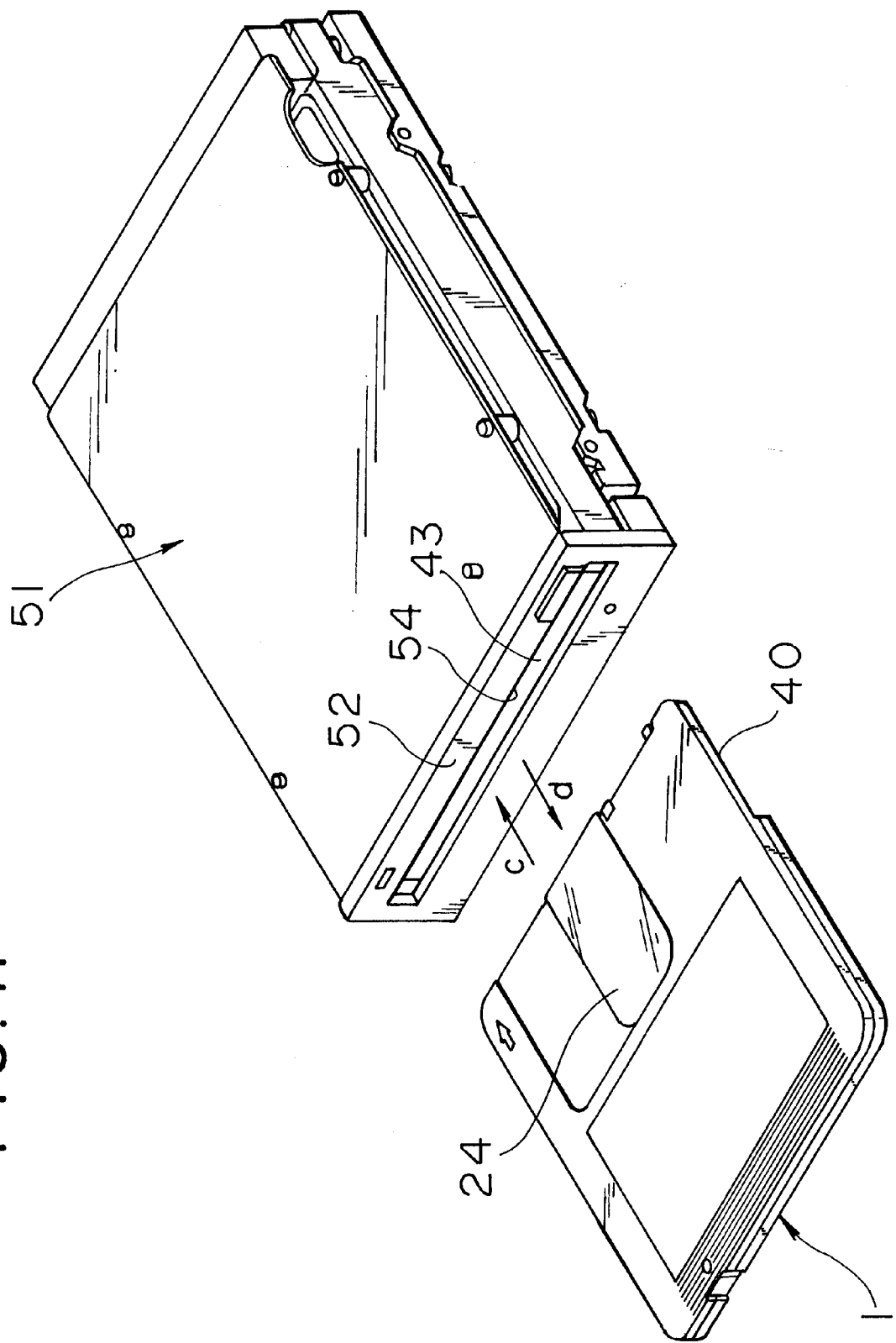
FIG. 11 is a perspective view illustrating the HS cartridge and an HS drive.

The mechanical strength of the wings 41 may be further increased by forming a plurality of reinforcing ribs 41d on the pair of right and left wings 41 at locations inside the peripheral rib 41a as shown in FIG. 3. Similarly, the mechanical strength of the roofs 43 on the cut-away portions may be further increased by forming reinforcing ribs 43d on the lower surface 43b of the right and left roofs 43 on the cut-away portions such that the reinforcing ribs 43d are located on the open sides of the cartridge drawing notches 42. The vertical depth $T_4$ of each cartridge drawing notch 42 is precisely defined by the reinforcing rib 43d so that the cartridge drawing means (not shown) can easily be fitted vertically and horizontally into and separated from the cartridge drawing notches 42.

Whole Construction of the HS Cartridge

The whole construction of the HS cartridge will be described with reference to FIGS. 4 to 11.

The HS cartridge serving as a disk cartridge includes a flat and substantially square-shaped shell 4 composed of upper and lower injection-molded synthesis-resin shells 2 and 3 fitted into each other and bonded together into a single form by means of for example welding. In the inside of the shell 4, an HS disk 5 serving as a disk-shaped recording medium is disposed in a freely-rotatable fashion. A high density magneto-optic disk having a higher storage density than a normal magneto-optic disk is employed as the HS disk 5. At the center of the HS disk 5, there is provided a center hub 6 made up by means of pressing a metal plate such as a stainless steel plate and bonded to the central portion of the HS disk 5. A spindle insertion hole 6a is formed in the center of the center hub 6.

Rib-shaped peripheral walls 2e and 3e are formed in an integral fashion on the lower surface of the roof wall 2a of the upper shell 2 and on the bottom wall 3a of the upper shell 3, respectively, along three sides including left and right edges 3c and the rear edge 3d except the front edges 2b and 3b in such a manner that the peripheral walls 2e and 3e have a ring-like shape extending along the periphery on the lower surface of the roof wall 2a and on the upper surface of the bottom wall 3a. A plurality of welding dowels 10 and 11 are integrally formed on the lower surface of the roof wall 2a and on the upper surface of the bottom wall 3a at locations outside the disk periphery supporting ribs 7 and 8 in such a manner that the dowels 10 and 11 face each other from above and below. The upper and lower shells 2 and 3 are fitted into each other from above and below, and the plurality of welding dowels 9 and 10 are welded by means of ultrasonic welding thereby combining the upper and lower shells 2 and 3 into a single piece of shell 4 having a flat and square shape. At least on either the roof wall 2a of the upper shell 2 or the bottom wall 3a of the lower shell 3, there are provided a plurality of spacers such as pins, ribs, or bosses for defining the space between the roof wall 2a and the bottom wall 3a.

When the upper and lower shells 2 and 3 are combined together, the pair of upper and lower disk periphery supporting ribs 7 and 8 are placed one on the other and a flat and circular space 13 for accommodating the disk is created inside the ribs 7 and 8 in which the HS disk 5 is disposed in a horizontal position such that it can freely rotate. A ring-shaped upper-side disk supporting rib 14 is formed in an integral fashion on the lower surface of the roof wall 2a of the upper shell 2 such that the center of the ring-shaped upper-side disk supporting rib 14 is located on the cartridge center $P_1$ (the center line extending vertically at the center of the horizontal width of the shell 4) which is also the center of the disk periphery supporting rib 7. On the other hand, a disk table insertion hole 15 is formed in the bottom wall 3a of the lower shell 3 such that the center of the circular hole 14 is on the cartridge center $P_1$ which is also the center of the disk periphery supporting rib 8. The center hub 6 of the HS disk 5 is loosely fitted into the disk table insertion hole 15.

A pair of upper and lower head insertion openings 16 and 17 having a long and narrow rectangular shape are formed in the roof wall 2a of the upper shell 2 and the bottom wall 3a of the lower shell 3, respectively, such that they extend along the cartridge center $P_1$ from the vicinity of the periphery of the disk table insertion hole 15 to the front edges 2b and 3b of the upper and lower shells 2 and 3. At the open ends 16a and 17a of the pair of the head insertion holes 16 and 17 on the sides of the front edges 2b and 3b, there is provided a pair of upper and lower bridge bars 18 and 19 having shapes substantially symmetric to each other wherein the upper bridge bar 18 is formed on the lower surface 2a of the roof wall of the upper shell 2 and the lower bridge bar 19 is formed on the upper surface of the bottom wall 3a such that they extend horizontally across the width of each head insertion hole 16 and 17 (in a direction perpendicular to the cartridge center $P_1$). These two bridge bars 18 and 19 are connected to each other at the center of the thickness of the shell 4. The inner sides 18a and 19a of the respective bridge bars 18 and 19 are curved in such a manner that the radii of their curvatures are equal to the radii of the curvatures of the inner faces 7a and 8a of the pair of upper and lower disk periphery supporting ribs 7 and 8. The outer sides 18b and 19b of the bridge bars 18 and 19 have a flat surface perpendicular to the cartridge center $P_1$.

A pair of shutter guide grooves 21 and another pair of shutter grooves 22 are formed on the lower and upper surfaces of the roof wall 2a and the bottom wall 3a of the upper and lower shells 2 and 3 at the right and left sides of the bridge bars 18 and 19. Thus, in total, four shutter guide grooves 21 and 22 extend along the front edges 2b and 3b in a direction perpendicular to the cartridge center $P_1$. A shutter slider 23 made up of a synthesis resin is disposed outside the pair of the upper and lower bridge bars 18 and 19 and between the front edges 2a and 3a of the upper and lower shells 2 and 3 such that the shutter slider 23 extends to a direction perpendicular to the cartridge center $P_1$. A pair of right and left guide plates 23a and 23b are integrally formed on the inner sides of the right end left ends of the shutter slider 23. The pair of right and left guide plates 23a and 23b are fitted in the corresponding shutter guide grooves 21 and 22 located on the right and left sides of the upper and lower shells 2 and 3 such that the pair of right and left guide plates 23a and 23b can freely slide along the corresponding shutter guide grooves. With the above structure, the shutter slider 23 can freely slide within the front edges 2b and 3b of the upper and lower shells 2 and 3 in directions denoted by arrows an and b perpendicular to the cartridge center $P_1$ under the guide of the shutter guide grooves 21 and 22.

A shutter 24 is made up by means of pressing a metal plate such as a stainless steel plate in such a manner that the shutter 24 includes an upper shutter plate 24a and a lower shutter plate 24b connected to each other by a connecting plate 24c at one end of the upper and lower shutter plates 24a and 24b. The shutter 24 is fixed to the outer side of the shutter slider 23 via the connecting plate 24c by means of welding with a dowel or by means of a screw. The upper and lower shutter plates 24a and 24b of the shutter 24 are placed on the upper surface of the roof wall 2a of the upper shell 2 and on the lower surface of the bottom wall 3a of the lower shell 3, respectively, in such a manner that they can slide thereon. The upper shutter plate 24a has a small length so that it may cover only the upper head insertion hole 16, while the lower shutter plate 24b has a longer length so that it may cover both the lower head insertion hole 17 and the disk table insertion hole 16 at the same time. The upper and lower shutter plates 24a and 24b slide in directions denoted by the arrows an and b within shutter slide recessed spaces 25 and 26 formed on the upper surface of the roof wall 2a of the upper shell 2 and on the lower surface of the bottom wall 3a of the lower shell 3 wherein each shutter slide recessed space has a height nearly equal to the thickness of the shutter plates 24a and 24b. The end portion (the end opposite to the connecting plate 24) of the lower shutter plate 24b having a larger size is inserted inside a shutter guide plate 27 made up of stainless steel or the like and fixed by means of for example bonding to an end wall of the lower recessed space 26 in such a manner that the lower shutter plate 24b can freely slide therein.

With the above arrangement, the shutter 24 can slide together with the shutter slider 23 in the directions denoted by the arrows an and b along the front edges of the upper and lower shells 2 and 3 between the closed position shown in FIG. 9 (in which the disk table insertion hole 15 and the upper and lower head insertion holes 16 and 17 are closed by the upper or lower shutter plates 24a and 24b) and the open position shown in FIG. 10 (in which the upper and lower shutter plates 24a and 24b are moved aside from the disk table insertion hole 15 and the upper and lower head insertion holes 16 and 17 so that the disk table insertion hole 15 and the upper and lower head insertion holes 16 and 17 are all opened).

A shutter spring space 28 having a triangle-like shape is created inside the one side of each front edge 2b and 3b of the upper and lower shells 2 and 3, and surrounded by the peripheral ribs 2e and 3e and the disk periphery supporting ribs 7 and 8. A shutter spring 29 is disposed in the above shutter spring space 28. The shutter spring 29 is formed of a coil spring into a V shape. One end 29a of the shutter spring 29 is fixed to the guide plate 23a disposed on one side of the shutter slider 23, and the other end 29b of the shutter spring 29 is fixed to a spring stopper 30 disposed on either the lower surface of the roof wall 2a of the upper shell 2 or the upper surface of the bottom wall 3a of the lower shell 3 so that the shutter 24 and the shutter slider 23 are urged by the shutter spring 29 in the direction denoted by the arrow b to the closed position.

A pair of right and left positioning holes 31 are formed in the bottom wall 3a of the lower shell 3 at locations near the rear edge 3d. A write protector 32 for preventing an erroneous erasing operation is disposed on the rear edges 2a and 3d, on one side, and inside the upper and lower shells 2 and 3 such that it can freely slide in the directions denoted by the arrows an and b. The write protector 32 is loosely fitted in a protector guide rib 33 formed in an integral fashion either on the lower surface of the roof wall 2a of the upper shell 2 or on the upper surface of the bottom wall 3a of the lower shell 3. Erroneous erasing protection holes 34 and 35 are formed in the roof walls 2a of the upper shell 2 and the bottom wall 3a of the lower shell 3, respectively, wherein the erroneous erasing protection holes 34 and 35 are opened and closed with the write protector 32. A hole 36 is formed in the rear edges 2d and 3d of the upper and lower shells 2 and 3 so that the write protector 32 can be operated via the hole 36. A recess 37 is formed on the front edges 2b and 3b at locations opposite to the sliding space for the shutter 24 such that the recess 37 extends in a direction perpendicular to the cartridge center $P_1$. In the recess 37, at a location opposite to the shutter 24, a shutter open-and-close pin accepting recess 38 is formed. At a location on the same side as the shutter 24 in the recess 37, there is provided a shutter open-and-close pin capture notch 39.

In addition to the basic structure described above, the HS cartridge 1 also has a mechanism for preventing the cartridge 1 from being inserted into an HS drive in an incorrect fashion and has a mechanism which allows the HS cartridge to automatically be loaded into the HS drive.

On the lower shell 3, a pair of right and left incorrect-insertion detection cut-away portions 40 are formed on its right and left edges 2c and 3c in the front sides 2b and 3b which will face the HS drive when being inserted into the HS drive wherein the cut-away portions 40 are formed by cutting away the right and left edges 2c and 3c from the lower surface of the lower shell 3 to the lower surface of the upper shell 2 in a direction parallel to the cartridge center $P_1$. The right and left wings 41 each have a portion covering the upper portion of the corresponding detection cut-away portions 40 in the front edges 2b on the right and left edges 2c. The thicknesses of these wings 41 are slightly smaller than the overall thickness of the upper shell 2.

A pair of right and left cartridge drawing notches 42 having a semicircular shape are formed in the middle of the length (along the cartridge center $P_1$) of the pair of the right and left incorrect-insertion detection cut-away portions 40 of the lower shell 3. The depth (measured in the thickness direction of the shells 2 and 3) of the pair of right and left cartridge drawing notches 42 is equal to the depth of the pair of right and left incorrect-insertion detection cut-away portions 40. Portions of the roof wall 2a inside the pair of right and left wings 41 of the upper shell 2 serve as a pair of right and left notch roofs 43 for covering the upper portions of the pair of right and left cartridge drawing notches 42.

Dimensions of the HS Cartridge

The dimensions of the HS cartridge 1 having the above-described structure will be described below for various portions thereof. The diameter of the HS disk is about 3.5 inches or 85 mm to 90 mm, and typically 88 mm. The overall outside dimensions of the HS cartridge 1 are nearly equal to those of a 3.5 inch floppy disk cartridge. The overall width $W_1$ measured between the right and left sides, the depth $D_1$ measured from the front to rear edges, and the thickness $T_1$ measured between the upper and lower surfaces are $W_1=92$ mm, $D_1=97$ mm, and $T_1=5$ mm. The thicknesses $T_2$ and $T_3$ of the upper and lower shells 2 and 3 are each 2.5 mm. The inner diameter $D_2$ of the disk insertion hole 15 is 19.5 mm. The width $W_2$ of the upper head insertion hole 16 measured between the right and left ends is 16 mm and the depth $D_3$ thereof measured between the front and rear ends is 38 mm. The width $W_3$ of the lower head insertion hole 17 measured between the right and left ends is 19.5 mm and the depth $D_4$ thereof measured between the front and rear ends is 38 mm. The width $W_4$ of each erroneous erasing detection cut-away part 40 measured between the right and left ends is 2.5 mm, the depth $T_4$ thereof measured between the upper and lower ends is 3.0 mm, and the length $L_1$ between the front and rear ends is 38.5 mm. The thickness $T_5$ measured between the upper and lower surfaces of each wing 41 of the upper shell 2 is 2.0 mm. The width $W_5$ measured between the front and rear ends of each cartridge insertion hole 42 is 4.3 mm, the depth $D_5$ thereof measured between the right and left ends is 3.0 mm. The depth measured between the upper and lower ends of each cartridge insertion hole 42 is selected to 3.0 mm so that it becomes equal to the depth $T_4$ measured between the upper and lower ends of each erroneous erasing detection cut-away part 40.

HS Drive

Referring now to FIGS. 11 to 15, an HS drive 51 serving as a disk drive for recording (writing) and reproducing (reading) information onto and from the HS disk 5 will be described below.

A horizontally-long cartridge insertion slot 53 is formed in the front panel 52 of the HS drive 51. The cartridge insertion slot 53 has an open-and-close door 53 which can be opened inward. A cartridge holder 55 is horizontally disposed inside the HS drive 51 at a location behind the cartridge insertion slot 53. Inside the cartridge holder 55, a pair of right and left cartridge insertion guides 55b is horizontally disposed on the inner walls of the right and left sides just under the horizontal roof plate 55a. Each cartridge insertion guide 55b is composed of upper and lower horizontal plates wherein one end of each horizontal plate is connected to each other by a vertical plate and the other end is open. The respective cartridge insertion guide 55b is disposed such that the open ends thereof face each other. Thus the right and left cartridge insertion guides 55b are symmetric to each other. Right and left incorrect-insertion preventing projections 56 are formed on the inner wall of the vertical plates of the right and left cartridge insertion guides 55b, respectively, so that each is located at nearly centers between the front and rear ends of the respective cartridge insertion guides 55b (the respective cartridge insertion guides 55b extend in directions denoted by arrows c and d).

A fulcrum pin 57 is disposed vertically on the upper roof plate 55a of the cartridge holder 55. A horizontal shutter open-and-close lever 58 is disposed on the upper roof plate 55a in such a manner that the fulcrum pin 57 is inserted through a long hole 59 formed in one end portion of the shutter open-and-close lever 58, and thus the lever 58 can freely rotate about the fulcrum pin 57 in back-and-forth directions and slide to the right and left via the long hole 59. A shutter open-and-close pin 60 is fixed vertically to the lower side of the other end portion of the shutter open-and-close lever 58. The pin 60 is vertically inserted into the cartridge holder 55 through a guide slot 61 formed in the roof plate 55a. The shutter open-and-close lever 58 is urged and moved by an extension spring serving as an ejection spring 62 from a point where the shutter is closed as shown in FIG. 13 to a point where the shutter is open as shown by alternate long and short dash line in FIG. 12. Furthermore, a head insertion cut-away portion 63 in the shape of a long hole is formed from a central part of the roof plate 55a to the rear edge along the cartridge center $P_1$. A plurality of flat springs serving as cartridge pressing springs 64 are fixed to the roof plate 55a. Inside the HS drive 51, there is provided a holder elevation mechanism (not shown) for moving the cartridge holder 55 down and up by means of a parallel motion mechanism.

Inside the HS drive 51 and below the cartridge holder 55, the vertical spindle 66 of a spindle motor 65 and a disk table 67 including a rotor and a housing formed in an integral fashion are disposed at a location which is on the cartridge center $P_1$ and deviated toward the front panel 52. Furthermore, Inside the HS drive 51, at a location behind the spindle motor 65 (that is, at a location deviated from the spindle motor 65 in a direction denoted by the arrow c) and below the cartridge holder 55, an objective lens 69 of an optical pickup 68 is disposed on the cartridge center $P_1$ wherein the objective lens 69 is fixed on a carriage 70. Furthermore, The carriage 70 is moved for seeking in directions denoted by the arrows c and d by means of right and left linear motors 74 each including a guide shaft 71, voice coil 72, and a magnetic circuit 73 including a yoke and a magnet.

An optical block 75 of the optical pickup 68 is disposed behind the carriage 70 spaced therefrom (the pickup 68 is spaced from the carriage 70 in a direction denoted by the arrow c). The optical block 75 includes a laser diode 76, a collimator lens 77, a beam splitter 78, a multi-lens 79, a photo transistor 80 for reading operation, and a photo transistor 81 for monitoring operation. A galvanomirror 82 is disposed at a location on the cartridge center $P_1$ and at one side of the optical block 75. The carriage 70 has a light transmission hole 83 extending horizontally on the cartridge center $P_1$. Inside the light transmission hole 83, a bending-up mirror 84 is disposed just below the objective lens 69. Furthermore, A magnetic field modulation head 86 in the form of a flying head is fixed to the carriage via a suspension 85 or the like connected to the rear end of the carriage 70 (the end portion facing the same direction as the arrow c), wherein the magnetic field modulation head 86 is located on the cartridge center $P_1$ and just above the objective lens 69. Furthermore, in the HS drive 51, there is also provided a head elevation mechanism (not shown) for moving the magnetic field modulation head 86 up and down in synchronization with the upward or downward motion of the cartridge holder 55.

To load the HS cartridge 1 into the HS drive 51 having the above-described construction, the HS cartridge 1 is inserted horizontally into the HS drive 51 via the cartridge insertion opening 54 with the front edges 2a and 3a advancing first while maintaining the HS cartridge in the correct position in which its upper shell 2 faces up and the lower shell 3 faces down. The open-and-close door 53 is pushed by the HS cartridge 1 and thus is opened inward. The HS cartridge 1 is inserted horizontally in the direction denoted by the arrow an into the right and left cartridge insertion guides 55b located at the right and left sides just below the roof plate 55a of the cartridge holder 55. If the HS cartridge 1 is inserted into the cartridge holder 55 in the direction denoted by the arrow c in the above-described manner, the right and left incorrect-insertion detection cut-away portions 40 of the HS cartridge 1 advance in the correct direction denoted by the arrow c passing by the right and left incorrect-insertion preventing projections 56 of the cartridge holder 55. In other words, when the HS cartridge 1 is correctly inserted into the cartridge holder 55, the right and left incorrect-insertion preventing projections 56 are correctly inserted in the direction denoted by the arrow d into the right and left incorrect-insertion detection cut-away portions 40. In this case, the HS cartridge 1 can be inserted into the cartridge holder 55 without encountering any obstruction.

Figure 12:
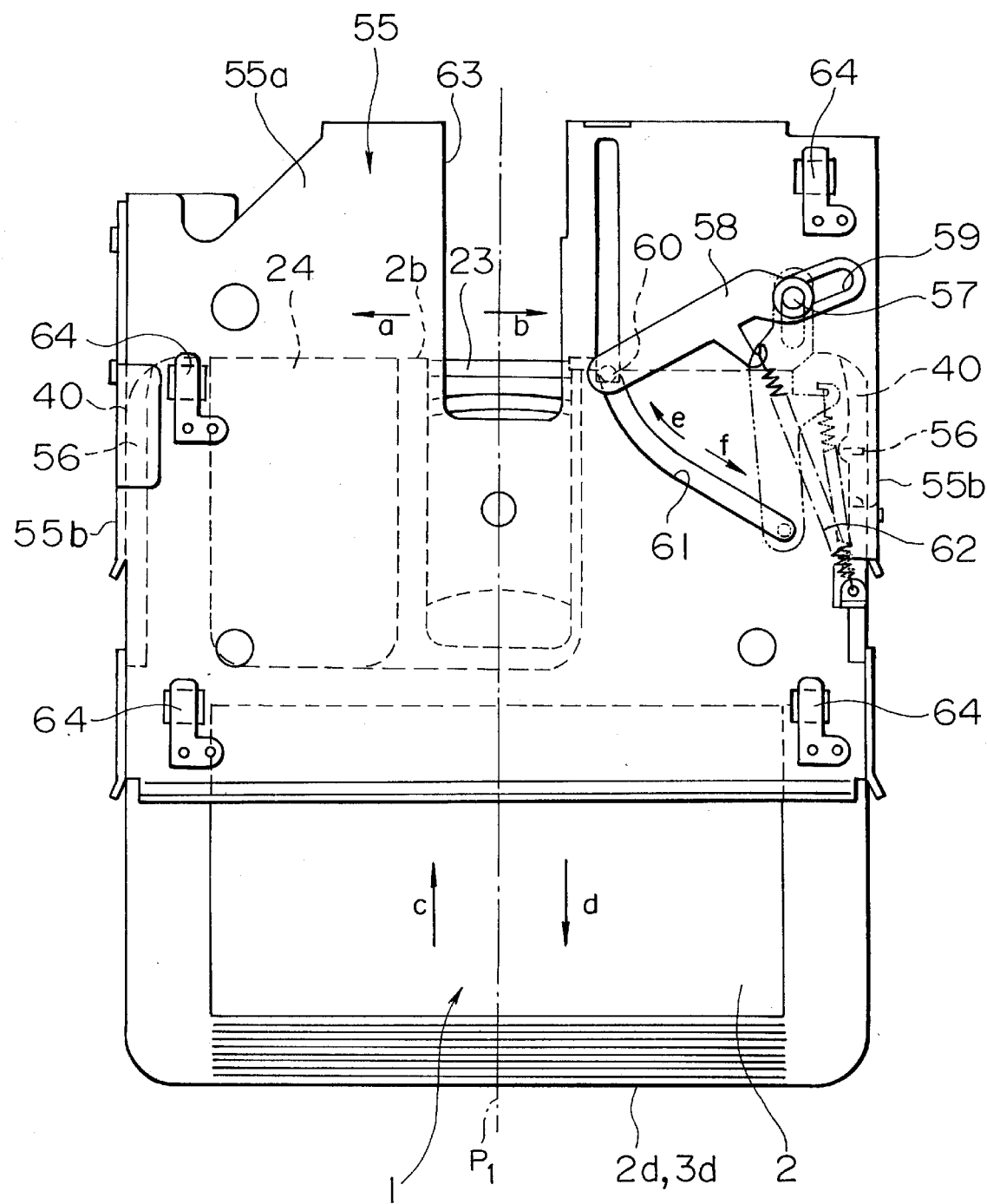
FIG. 12 is a plan view illustrating the operation of inserting the HS cartridge into the cartridge holder of the HS drive.
Figure 13:
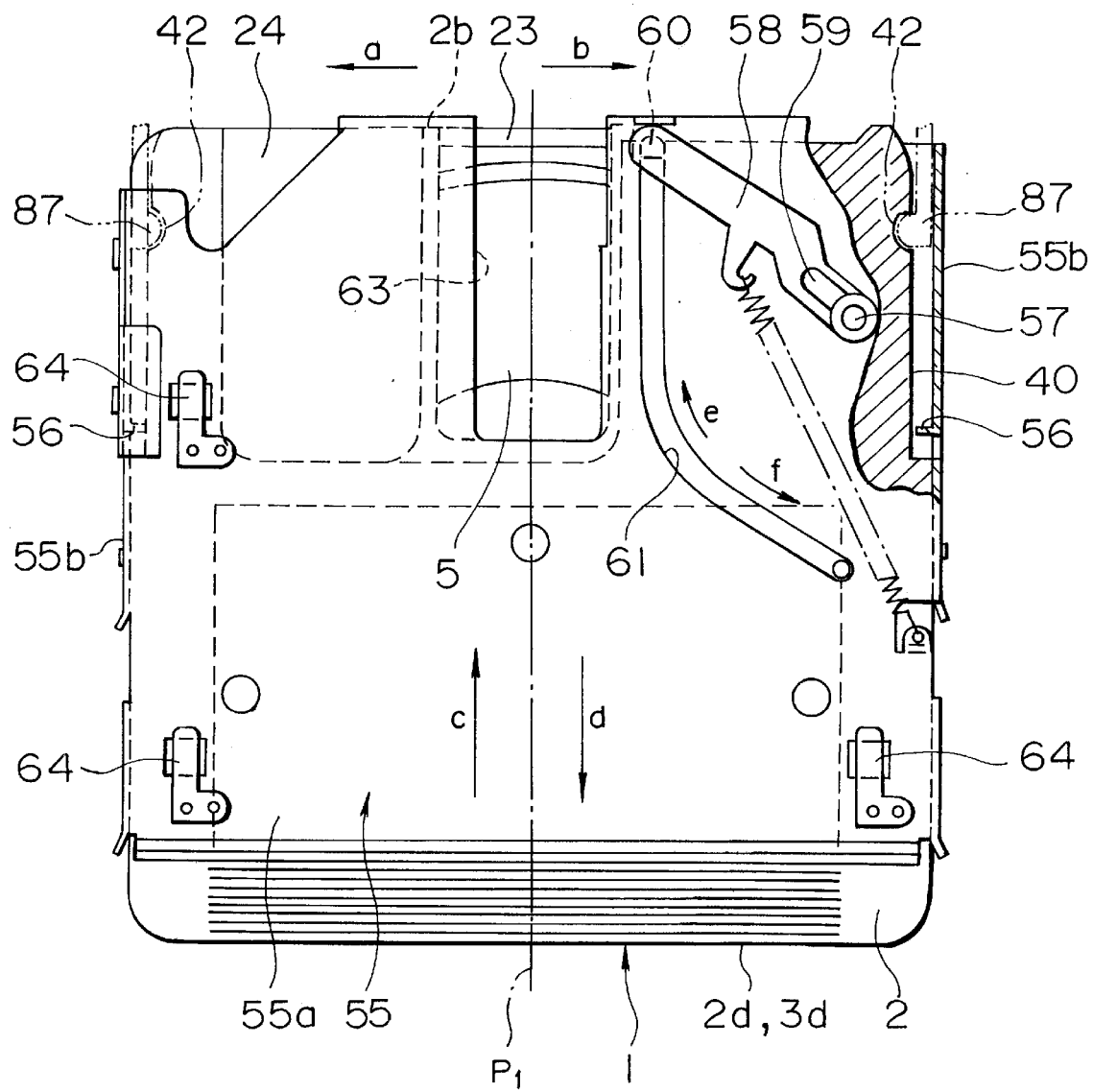
FIG. 13 is a plan view of the HS cartridge after being inserted into the cartridge holder.
Figure 14:
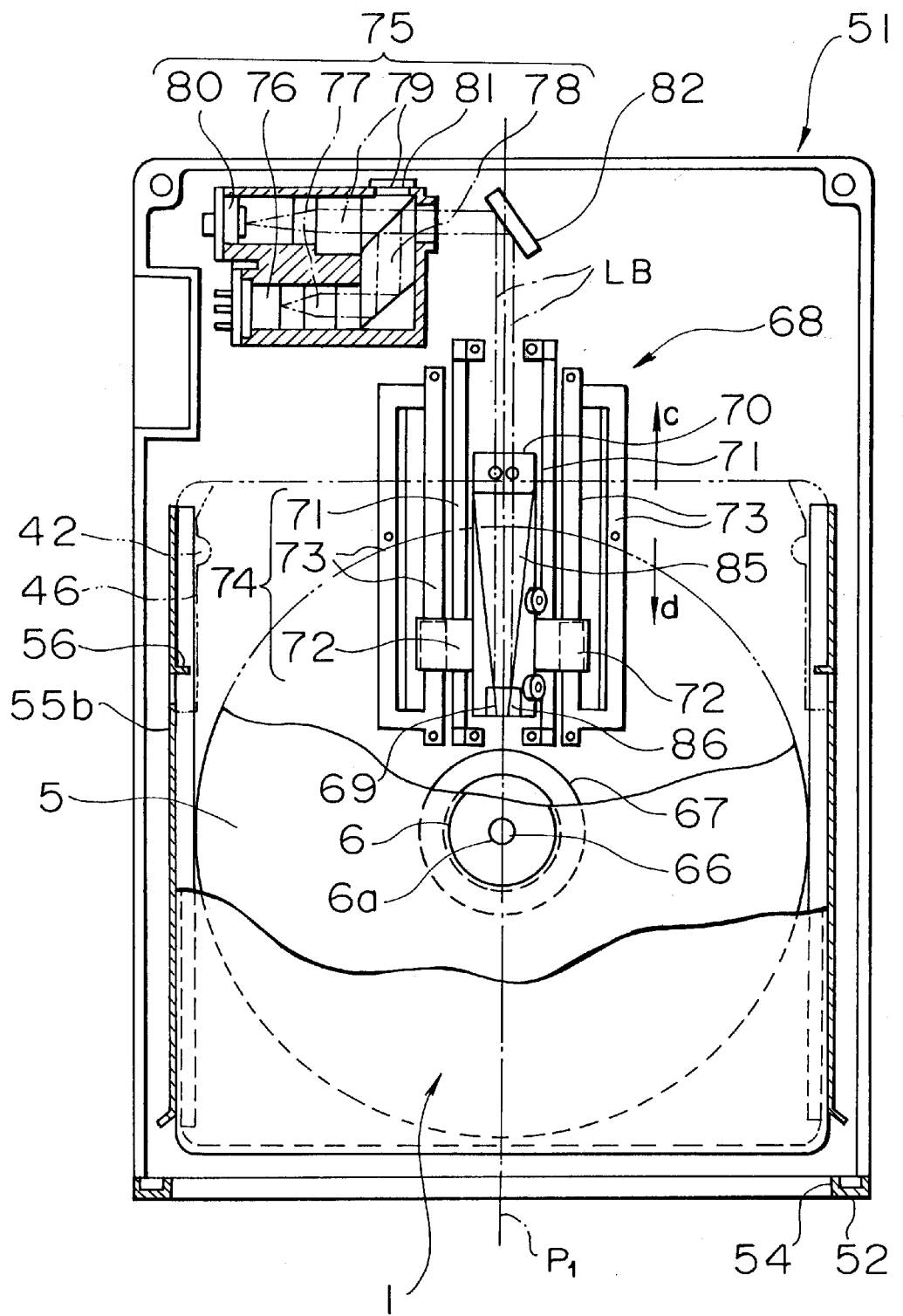
FIG. 14 is a plan view, partly cutaway, of an optical pick-up and a magnetic field modulation head disposed in the HS drive.
Figure 15:
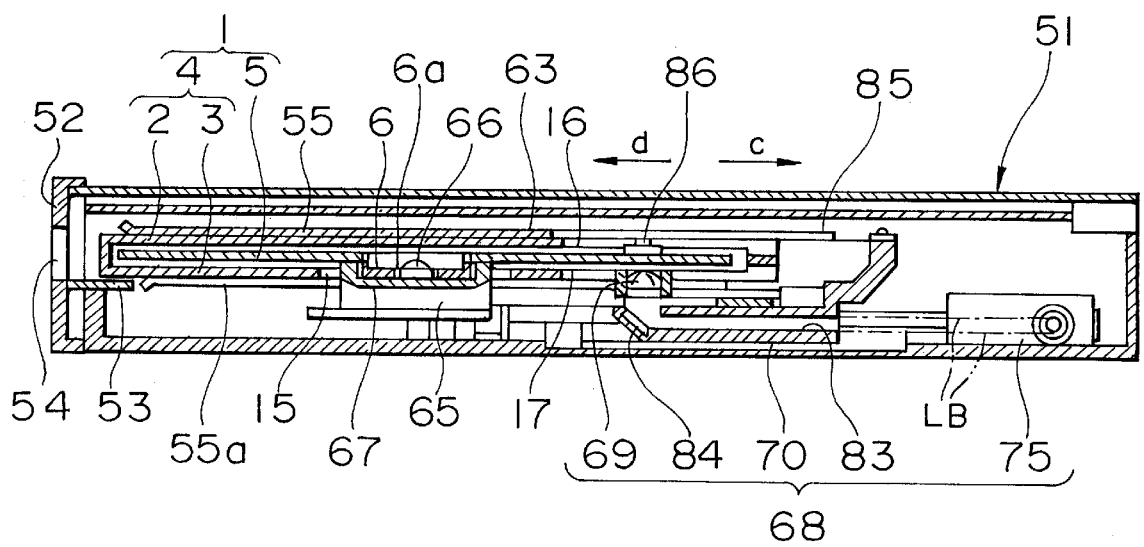
FIG. 15 is a cross-sectional view of FIG. 14.

With the inserting motion of the HS cartridge 1 in the direction denoted by the arrow c into the cartridge holder 55, the shutter open-and-close pin 60 held by the ejection spring 62 at the home position represented by the alternate long and short dash line in FIG. 12 is introduced into the shutter open-and-close pin accepting recess 38, shown in FIG. 9, of the HS cartridge 1, and is pushed by the recessed portion 37 in the direction denoted by the arrow c. As a result, as shown by the solid line in FIG. 12, the shutter open-and-close pin 60 is moved along the recessed portion 37 and in the direction denoted by the arrow an under the guide of the guide slot 61. The shutter open-and-close lever 58 is rotated in the direction denoted by the arrow an against the force of the ejection spring 62, and one end of the shutter slider 23 is pushed by the shutter open-and-close pin 60 in the direction denoted by the arrow a. The shutter 24 is slid together with the shutter slider 23 from the closed position shown in FIG. 9 to the open position shown in FIG. 10 against the force of the shutter spring 29. As a result, the disk table insertion hole 15 and the upper and lower head insertion holes 16 and 17 of the HS cartridge are all opened at the same time.

When the shutter 24 reaches the fully open position, the shutter open-and-close pin 60 is captured into the shutter open-and-close pin locking notch 39 and locked. The HS cartridge 1 is further inserted into the cartridge holder 55 in the direction denoted by the arrow c. When the HS cartridge 1 reaches the final position shown in FIG. 13, the HS cartridge 1 is stopped by a cartridge stopper (not shown) provided in the cartridge holder 55, and the HS cartridge 1 rests at that position in the cartridge holder 55. In the above operation, after being locked into the shutter open-and-close pin locking notch 39 of the HS cartridge 1, the shutter open-and-close pin 60 moves in the direction denoted by the arrow c along the guide slot 61.

Upon the completion of the insertion of the HS cartridge 1 into the cartridge holder 55, the cartridge holder 55 is moved downward by means of parallel motion. Then the HS cartridge 1 is placed on a plurality of cartridge positioning pins (not shown) provided in the HS drive 51 and set horizontally thereon. Of these positioning pins, two pins are fitted into right and left positioning holes 31 of the HS cartridge 1, respectively. The HS cartridge 1 is pressed by a plurality of cartridge presser springs 64 of the cartridge holder 55 against the plurality of cartridge positioning pins so that the HS cartridge is held at a correct position. In this way, the HS cartridge 1 is loaded into the HS drive 51.

Since the power supply switch of the HS drive 51 was turned on before starting the loading operation, the spindle more 65 has already started to rotate. When the loading of the HS cartridge 1 is completed, the spindle 66 and the disk table 67 are inserted from below into the disk table insertion hole 15 of the HS cartridge 1, and the upper end portion of the spindle 66 is inserted into the spindle insertion hole 6a of the center hub 6 of the HS disk 5. The center hub 6 is fitted into the disk table 67 and magnet-chucked. The HS disk 5 is lifted by the disk table 67 so that the HS disk 5 floats at the vertical center in the shell 4.

At the same time, the objective lens 69 of the optical pick-up 68 is inserted from below into the lower head insertion hole 17 of the HS cartridge 1 so that the objective lens 69 is located adjacent to the lower surface of the HS disk 5. On the other hand, the magnetic field modulation head 86 is inserted from above into the upper head insertion hole 16 of the HS cartridge 1 via the head insertion cut-away portion 63 of the cartridge holder 55 such that the magnetic field modulation head 86 floats above the upper surface of the HS disk 5 via an air film.

After that, the HS disk 5 is driven by the spindle motor 65 so that it rotates at a high speed within the HS cartridge 1. The carriage 70 of the optical pick-up 68 is moved in the directions denoted by the arrows c and d for seeking operation by the right and left linear motors 74, while the objective lens 69 and the magnetic field modulation head 86 are moved for seeking as an unit in the directions denoted by the arrows c and d along the cartridge center $P_1$. While modulating the magnetic field applied to the HS disk 5 by means of the magnetic field modulation head 86, the HS disk 5 is illuminated from below via the objective lens 69 by a laser beam LB emitted from the optical block 75 of the optical pick-up 68 thereby recording/reproducing information onto/from the HS disk 5.

In the above illumination process, the laser beam LB emitted by the laser diode 76 of the optical block 75 passes through the collimator lens 77 and the beam splitter 78, and then is horizontally incident on the galvanomirror 82 located outside the optical block 75. The laser beam LB is 90° bent in a horizontal plane by the galvanomirror 82 so that the laser beam LB is directed to the bending-up mirror 84 located in the light transmission hole 83 of the carriage 70. Furthermore, The laser beam LB is bent by 90° by the bending-up mirror 84 and the resultant laser beam LB travels upward in a vertical direction so that the objection lens 69 is illuminated from below by the laser beam LB. The objective lens 69 focuses the laser beam LB onto the lower surface of the HS disk 5 so that the HS disk 5 is illuminated from below by the laser beam LB which is incident normally thereon. The laser beam LB reflected by the HS disk 5 returns via the objective lens 69, the bending-up mirror 84, the galvanomirror 82, to the beam splitter 78 of the optical block 75. The beam splitter 78 is further passed through the multi-lens 79 and is incident on the photo transistor 80 for reading operation or the photo transistor 81 for monitoring operation. In this way, information is recorded onto and read from the HS disk 5. After completion of the recording or reproducing operation onto or from the HS disk 5, the HS cartridge 1 is ejected in an order opposite to that in the loading operation described above. That is, first, the cartridge holder 55 is moved upward by means of parallel motion within the HS drive 51 thereby moving up the HS disk 5 together with the HS cartridge 1. As a result, the HS disk 5 is separated upward from the spindle 65 and the disk table 67. At substantially the same time, the magnetic field modulation head 86 is moved upward away from the head insertion cut-away portion 63 of the cartridge holder 55. Furthermore, When the moving-up operation of the cartridge holder 55 is completed, the shutter open-and-close lever 58 is moved by the ejection spring 62 in the directions denoted by the arrows d and f, and the shutter open-and-close pin 60 is moved along the guide slot 61 in the directions denoted by the arrows d and f. As a result, the HS cartridge 1 is ejected in the direction denoted by the arrow d by the shutter open-and-close pin 60 to the outside of the HS drive 51 via the cartridge insertion slot 54. During the above operation, the shutter 24 of the HS cartridge 1 is slid by the shutter spring 29 in the direction denoted by the arrow b to the closed position.

When the HS cartridge 1 is inserted in the direction denoted by the arrow c into the HS drive 51 via the cartridge insertion slot 54, if the HS cartridge 1 is inserted in a wrong manner as in the case where the rear end of the HS cartridge faces the insertion slot 54 or as in the case where the upper side of the HS cartridge faces down, the insertion of the HS cartridge 1 is prevented by the right and left incorrect insertion preventing projections 56 located in the cartridge holder 55. Furthermore, since the vertical thickness $T_4$ of each of the right and left incorrect-insertion detection cut-away portions 40 of the HS cartridge is 3.0 mm and the vertical thickness $T_5$ of each of the right and left wings 41 covering the upper part 16 of each of the right and left incorrect-insertion detection cut-away portions 40 is 2.0 mm, if a 3.5 inch floppy disk cartridge having a similar construction to the HS cartridge 1 except that the thickness is 3.0 mm is tried to be inserted by mistake into the HS drive 51, the insertion is also prevented by the right and left incorrect-insertion preventing projections 56.

In the case of an auto-loading HS drive, as shown by alternate long and short dash lines in FIG. 13, a pair of right and left cartridge drawing means 87 is disposed at locations at the back of the pair of incorrect-insertion preventing projections 56 and in the pair of right and left cartridge insertion guides 55b in the cartridge holder 55 so that when the HS cartridge 1 is inserted in the direction denoted by the arrow c in a correct fashion into the cartridge holder 55 to a certain depth, the pair of right and left cartridge drawing means 87 is fitted in the pair of right and left cartridge drawing notches 42 and the HS cartridge 1 is then automatically drawn in the direction denoted by the arrow c by the cartridge drawing means 87 to the position, shown in FIG. 13, in the cartridge holder 55 thereby automatically loading the HS cartridge.

Although the present invention has been described above with reference to specific embodiments, the invention is not limited to those. Various modifications are possible without departing from the spirit and the scope of the invention. For example, the disk-shaped recording medium used in the present invention is not limited to the HS disk. The present invention may also be applied to a variety of other disk-shaped recording media such as a CD, a CD-ROM, and floppy disk.

The disk cartridge having the above-described structure according to the invention has various advantages as described below. In an aspect of the invention, the upper shell is formed by means of molding with a synthesis resin in such a manner that regions, inside the peripheral ribs, of the lower surface of the pair of right and left wings integrally formed with the upper shell are recessed so that the these regions have a thickness nearly equal to the thickness of the roof wall of the upper shell thereby obtaining a good-appearance high-quality disk cartridge having no hollows or other deformations due to the deficiency of synthesis resin in the pair of right and left wings. The peripheral ribs allow the pair of right and left wings to have a large effective thickness and thus have a sufficiently large mechanical strength while achieving a great reduction in the thickness of the roof wall of the upper shell thereby achieving a great reduction in the overall thickness of the shell.

In another aspect of the invention, the upper shell is formed such that the thickness of the majority of the roof wall is equal to 1.2 mm and the thickness of the pair of right and left wings is equal to 1.3 mm thereby minimizing the transparency of the pair of right and left wings when the upper shell is made of a semitransparent synthesis resin while maintaining the thickness of the majority of the roof wall of the upper shell to a sufficiently small level and thus achieving a great reduction in the overall thickness of the shell.

In still another aspect of the invention, a plurality of reinforcing ribs are integrally formed on the pair of right and left wings, at locations inside the peripheral ribs thereby achieving a further increase in the mechanical strength of the pair of right and left wings.

What is claimed is:

1. A disk cartridge for accommodating a disk comprising:
   a case molded with a synthesis resin;
   a disk disposed in a freely rotatable fashion in said case;
   a pair of right and left incorrect-insertion detection cut-away portions formed on both sides of said case, said both sides being parallel to the insertion direction of said case into a disk drive; and
   a pair of right and left wings formed in an integral fashion on both sides of said case, said both sides being parallel to the insertion direction of said case into the disk drive, each said wing including one outer surface continuously extending from the principal surface of said case parallel to the surface of said disk, the other surface facing and covering a corresponding one of said pair of right and left incorrect-insertion detection cut-away portions, and a peripheral rib extending continuously from either side wall of said case and running along the periphery of the case and the wings that project from the case, wherein the peripheral rib projects in a direction perpendicular to the wings and parallel to said both sides of said case and wherein the thickness between said one surface and the other surface is smaller than the thickness of said peripheral rib of each said wing.

2. A disk cartridge, according to claim 1, wherein the thickness of each said incorrect-insertion detection cut-away portion is greater than the thickness of said wings.

3. A disk cartridge, according to claim 1, wherein a reinforcing rib is formed in an integral fashion on the other surface of each said wing.

4. A disk cartridge for accommodating a disk, comprising:

a case molded with a synthesis resin;

a disk disposed in a freely rotatable fashion in said case;

a pair of right and left incorrect-insertion detection cut-away portions formed on both sides of said case, said both sides being parallel to the insertion direction of said case into a disk drive;

a pair of right and left wings formed in an integral fashion on both sides of said case, said both sides being parallel to the insertion direction of said case into the disk drive, each said wing including one outer surface continuously extending from the principal surface of said case parallel to the surface of said disk, the other surface facing and covering a corresponding one of said pair of right and left incorrect-insertion detection cut-away portions, and a peripheral rib extending continuously from either side wall of said case and running along the periphery of the case and the wings that project from the case, wherein the peripheral rib projects in a direction perpendicular to the wings and parallel to said both sides of said case; and a pair of right and left cartridge drawing notches formed as continuities of said right and left incorrect-insertion detection cut-away portions of said case, said notches being located in the middle of the insertion direction of said pair of right and left incorrect-insertion detection cut-away portions of said case, each said notch having a wall continuously extending from the other surface of the corresponding wing, the portion of each notch opposite to said wall being open, wherein the thickness between said one surface and the other surface is smaller than the thickness of said peripheral rib of each said wing.

5. A disk cartridge, according to claim 4, wherein the thickness of said incorrect-insertion detection cut-away portions and the thickness of said cartridge drawing notches are greater than the thickness of said wings.

6. A disk cartridge, according to claim 4, further comprising a reinforcing rib formed at a location in the middle between each said incorrect-insertion detection cut-away portion and each said cartridge drawing notch, the thickness of said reinforcing rib being nearly equal to the thickness of said peripheral rib.

* * * * *